(12) United States Patent
Zindel (10) Patent No.: US 8,796,981 B2
(45) Date of Patent: Aug. 5, 2014

(54) REMOTE DISCHARGE GATE OPENER AND CLOSER FOR BULK SEED BOXES

(75) Inventor: Brian Zindel, Moweaqua, IL (US)

(73) Assignee: BMZE LLC, Moweaqua, IL (US)

( * ) Notice: Subject to any disclaimer, the term of this patent is extended or adjusted under 35 U.S.C. 154(b) by 178 days.

(21) Appl. No.: 13/594,307

(22) Filed: Aug. 24, 2012

(65) Prior Publication Data

US 2014/0056673 A1 Feb. 27, 2014

(51) Int. Cl.
*G05B 11/01* (2006.01)
*B65D 88/28* (2006.01)

(52) U.S. Cl.
CPC .................................. *B65D 88/28* (2013.01)
USPC .......................................... 318/671; 318/560

(58) Field of Classification Search
CPC ................................ B65D 88/28; B60R 1/072

USPC ..................................................... 318/671, 560
See application file for complete search history.

(56) References Cited

U.S. PATENT DOCUMENTS 5,845,799 A * 12/1998 Deaton .......................... 220/1.5
8,137,043 B2 3/2012 Beck

* cited by examiner

*Primary Examiner* — David Luo
(74) *Attorney, Agent, or Firm* — Daniel J Coughlin; Bradley S. Strahm (57) ABSTRACT

A portable device for remotely opening and closing the discharge gate of a bulk seed box. The device is lightweight and easily engages the bulk seed box. The device is cantilevered in place by sliding the mounting base into the receiving portion of the bulk seed box. The mounting base is configured to engage a series of holes in the bulk seed box. A remotely electric actuator operates a pivotally swinging opener arm. The opener arm engages the discharge gate handle, opening the discharge gate when the electric actuator arm is extended.

18 Claims, 7 Drawing Sheets

REMOTE DISCHARGE GATE OPENER AND CLOSER FOR BULK SEED BOXES

FIELD

This disclosure generally relates to a device for opening and closing the discharge gate of a bulk seed box from a remote location.

BACKGROUND

The seed and farming industries often need to transport large quantities of seed. Bulk seed boxes are a convenient and commonly used solution. Bulk seed boxes hold upwards of 2,000 pounds of seed. Seed from a bulk seed box can then be transferred to a truck, seed wagon, seed tender, planter, or other seed storage or transport device.

Bulk seed boxes generally have a discharge gate at the lower end, which must be positioned above the seed-receiving device prior to discharging the contents. The discharge gate needs to remain closed until the bulk seed box is properly positioned. The bulk seed box is commonly raised into position by a forklift. Once the box is in position, the operator needs to climb up the seed storage device or ladder to manually open the discharge door. This results in an inconvenience and danger to the operator. When the discharge gate is opened, seed flows downward out of the box under the force of gravity.

One potential solution to remotely opening a bulk seed box discharge gate is known in the art. U.S. Pat. No. 8,137,043 B2, to Beck, the disclosure of which is incorporated by reference, describes a device with a U-shaped frame with free ends that engage the lower end of a bulk seed box. The free ends have a spreader mechanism that applies a lateral pressure on the box, which relieves tension on the discharge gate and secures the device in place. A screw actuator is attached to the base of the U-frame and a supporting cross-brace. A gate engagement latch is directly attached to the end of the screw actuator. The screw actuator extends along with an angular guide arm to engage the closed discharge door and then contracts to open the door.

The existing solutions for opening the discharge gate of a bulk seed box are either inconvenient and dangerous or overly complicated such that the handheld removable device would be inconvenient to use due to weight and the time and effort required to engage and operate the device.

SUMMARY

It is therefore a an object of the present invention to provide a conveyor that overcomes some or all of the problems associated with existing bulk seed opening and closing solutions. For example, some advantages of the present invention include an apparatus which provides:
   a. a bulk seed box opener and closer that can be conveniently operated from a remote location, such as the operators seat of a fork lift or tractor;
   b. a bulk seed box opening and closing device that is lightweight and portable for easily engaging and disengaging various bulk seed boxes;
   c. a device that is simple and inexpensive to manufacture; and
   d. a device that is engaged simply and rapidly by merely sliding a mounting plate into the bulk seed box receptor slot and pivoting the opener arm and latch into position to engage the discharge gate handle.

The device has a compact lightweight frame that is generally T-shaped, with a mounting plate and a support arm. The device is capable of being removably engaged with the bulk seed box by sliding the mounting plate into an opening adjacent to the discharge gate.

The device has engagement members, or mounting feet, on the front side of the mounting plate and support tabs on the backside that are configured to align and support the device when the device is engaged. The front side of the mounting plate of the frame has protruding engagement members that are configured to insert into the openings in the lower portion of the bulk seed box, near the discharge gate. The backside of the mounting plate has one or more tabs that stabilize the device in a cantilevered configuration when the device is engaged with the bulk seed box. The engagement members and the support tabs are separated by a fixed width, which allows the device to be easily and rapidly engaged and disengaged from the bulk seed box without the necessity of fasteners or tools.

The fixed portion of an electrically powered actuator is mounted on the backside of the mounting plate and along the support arm. The adjustable arm of the actuator is attached to an opener arm with a pivot connector. The pivot connector allows the opener arm to rotate primarily horizontally. The pivot connector allows sufficient vertical movement to allow engagement of the U-shaped latch bar with the discharge gate. At the end opposite the pivot connection, the opener arm has a simple latch for engaging the discharge gate. The latch is a U-shaped bar that receives a tab handle on the discharge gate.

Bulk seed boxes generally have a pivoting lock mechanism that prevents the discharge gate from being inadvertently opened. In the locked position, a discharge gate lock tab prevents access to the discharge gate tab handle by the U-shaped latch bar. The device's latch has a gate lock diverting tab that ensures that the opener arm is not engaged with the discharge gate when the bulk seed box is locked. The gate lock diverting tab prevents the device from being used to attempt to open a locked discharge gate.

The operator of a forklift or tractor can remotely control the device. A forklift- or truck-mounted remote control switch is operably connected to the electric actuator. The operator can remotely extend or retract the adjustable actuator arm using the remote control switch. When the adjustable arm is extended, the latch of the opener arm pulls the discharge gate open which allows seed to fall. Retracting the adjustable actuator arm closes the discharge gate. The pivot connection between the opener arm and the electric actuator allows the device to remain engaged with the bulk seed box, even when the device is retracting and putting pressure to remove the device. When the device encounters resistance during retraction, the vertical movement allowed by the pivot connector allows the mounting plate, engagement members, and support tabs to maintain sufficient friction with the bulk seed box.

The device is then easily disengaged from the bulk seed box after seed has been discharged. The streamlined, minimal structure of the device allows for easy transportation and installation between the forklift and the bulk seed box. Further, the T-shaped frame allows for convenient storage in a nesting tube attached to the forklift. A forklift or tractor mounted retractable cord reel controls the length of the power control cord during installation and storage, which makes installation and storage of the device more efficient.

BRIEF DESCRIPTION OF DRAWINGS

Aspects are illustrated by way of example, and not by way of limitation, in the accompanying drawings, wherein.

DETAILED DESCRIPTION

Figure 1:
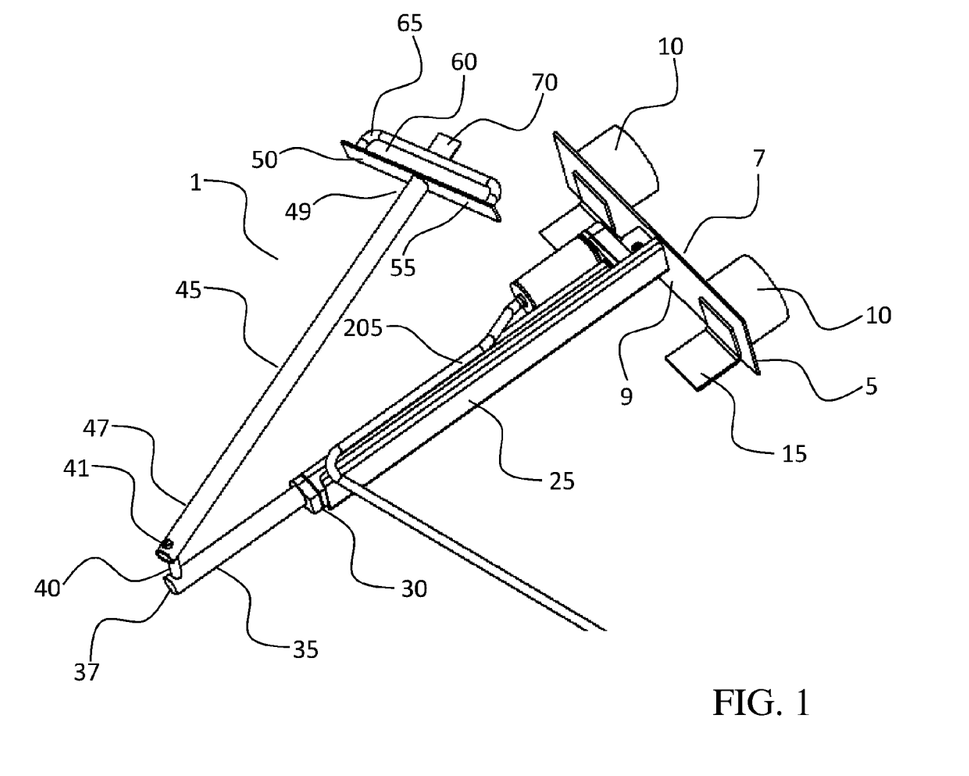
FIG. 1 is a top view of the unengaged device, with the opener arm pivoted to the side of the support arm.

Referring now to the invention in more detail, in FIG. 1 there is shown a gate opener 1, also referred to as the device. The device has a general T-shaped frame made up of a mounting plate 5 and a frame arm 25. The mounting plate 5 has a front side 7 and a rear side 9. The frame arm 25 is securely attached to the rear side 9 of the mounting plate 5 such that the frame arm 25 extends perpendicular from the mounting plate 5. The frame arm 25 may be welded or bolted to the mounting plate 5.

Figure 2:
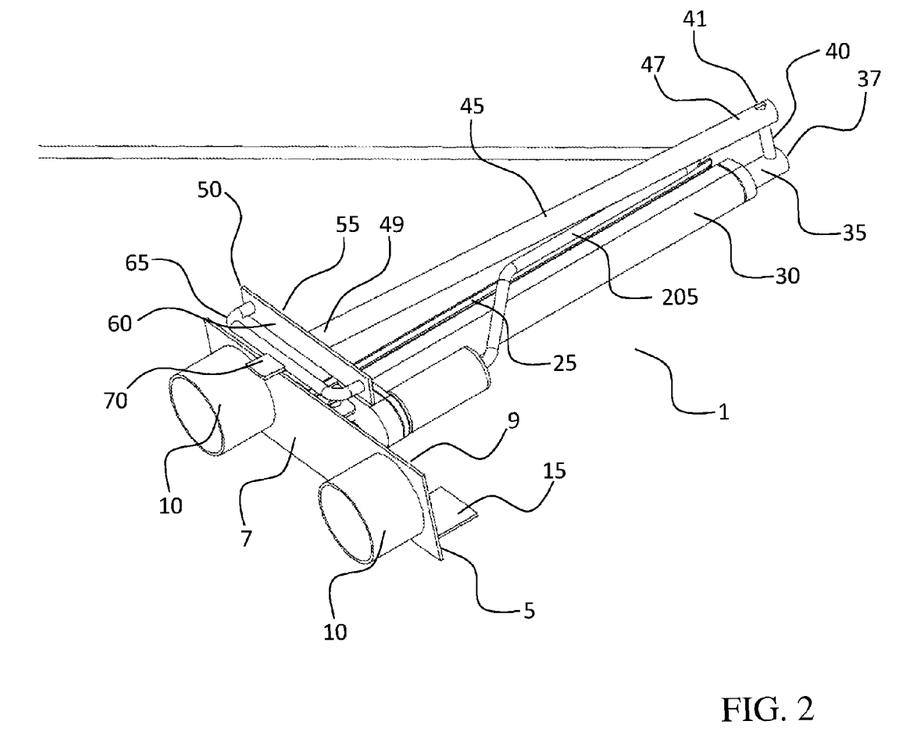
FIG. 2 is a front view of the unengaged device, with the opener arm pivoted inline with the support arm.

In FIG. 2 there is shown the front side 7 of the mounting plate 5. The mounting plate 5 has two or more engagement members 10 which are configured to align the device with the bulk seed box in the proper position. The engagement members 10 protrude from the front side 7 of the mounting plate 5 and are spaced apart horizontally by a fixed distance. The mounting plate 5 has one or more support tabs 15 that protrude from the rear side 9 of the mounting plate 5. The support tabs 15 are configured to engage the floor of the bulk seed box and stabilize the device as a cantilever.

An actuator 30 is securely attached to the mounting plate 5 and along the frame arm 25. The mounting plate 5, frame arm 25, and actuator 30 are immovably joined together to form the solid T-frame that is fixedly attached to the bulk seed box when the device is engaged. A power control cord 205 is operably connected to the actuator 30.

The actuator 30 has an adjustable actuator arm 35 that extends parallel to the frame arm 25. The adjustable actuator arm 35 has a distal end 37. When the adjustable actuator arm 35 extends from the actuator 30, the distal end 37 extends away from the mounting plate 5. When the adjustable actuator arm 35 retracts into the actuator 30, the distal end 37 moves inwardly toward the bulk seed box.

A pivot connector 40 extends vertically from the distal end 37 of the adjustable actuator arm 35. The pivot connector 40 pivotally connects the adjustable actuator arm 35 and an opener arm 45. The pivot connector 40 can be a pivot bolt 41 that passes through the adjustable actuator arm 35, a flexible rubber spacer, and the opener arm 45. The opener arm 45 is free to pivot primarily horizontally relative to the pivot connector 40. The ability to pivot horizontally and/or vertically are required in order to move the opener arm 45 to the proper position when the mounting plate 5 is engaged with the bulk seed box.

The opener arm 45 has a first end 47 that is pivotally connected to the adjustable actuator arm 35. The opener arm 45 has a second end 49 that is attached to a rear latch plate side 55 of a latch plate 50. The latch plate 50 extends perpendicular to the length of the opener arm 45. A latch 65 is securely attached to a front latch plate side 60 of the latch plate 50. The latch 65 is a generally U-shaped member that extends outwardly from the front latch plate side 60 of the latch plate 50. The latch 65 is configured with a gate lock diverter 70.

Figure 3:
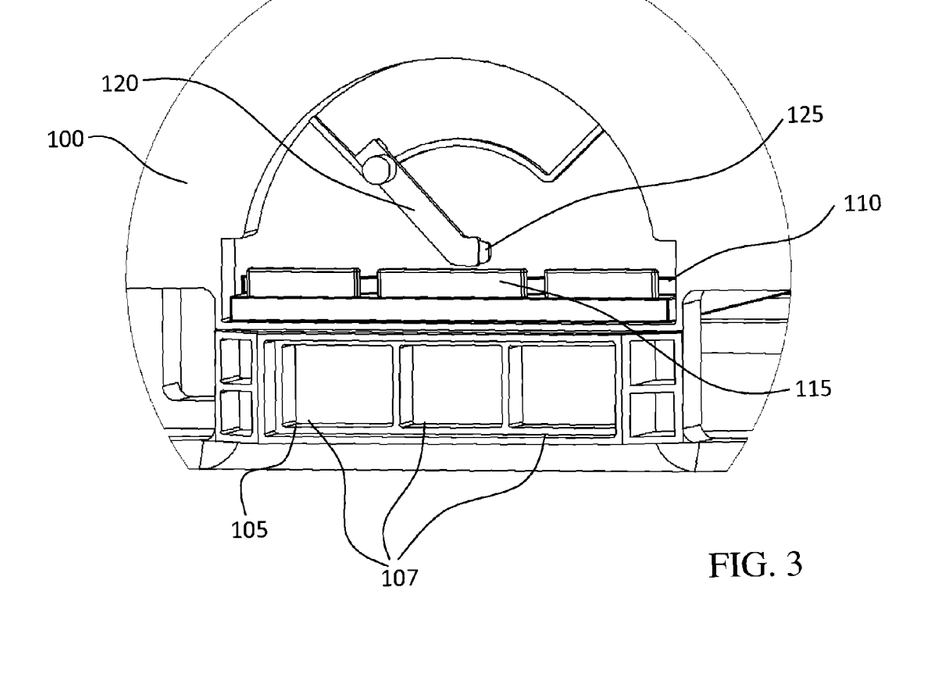
FIG. 3 is a side view of the bulk seed box engagement point, with the lock handle in the open position and the discharge gate closed.

In FIG. 3, there is shown the relevant portion of a bulk seed box 100. A mounting area 105 has one or more spaced-apart openings 107 that are inset from the surface of the bulk seed box 100. A discharge gate 110 controls the flow of seed from the bulk seed box by sliding between an opened and a closed position. The discharge gate 110 has at least one discharge gate tab 115 that acts as a handle to open the discharge gate 110. A lock handle 120 is located above the discharge gate 110. One end of the lock handle 120 has a lock tab 125 that prevents the discharge gate tabs 115 from being engaged by the latch 65 when the lock handle 120 is in the locked position.

Figure 4:
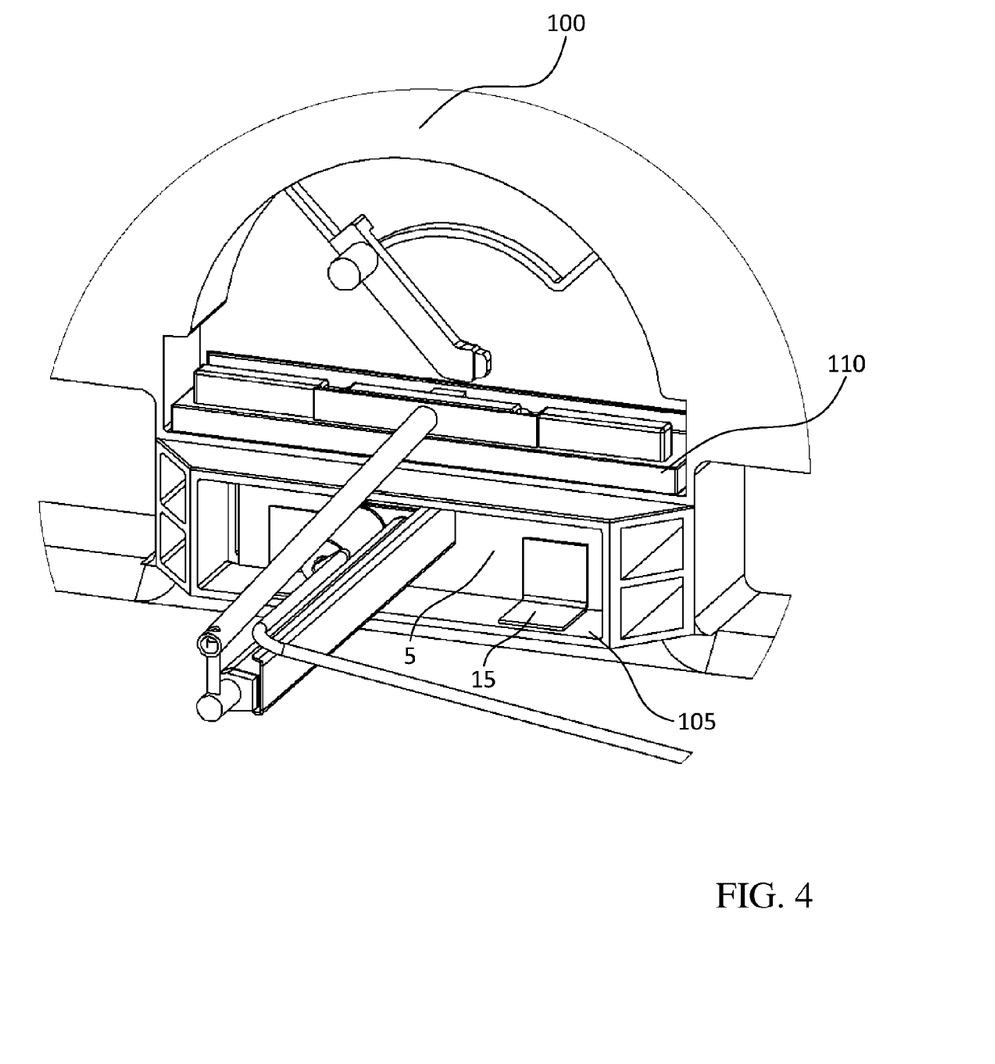
FIG. 4 is a side view of the bulk seed box with the device engaged.

In FIG. 4 there is shown the device engaged with the bulk seed box 100. To engage the device, the mounting plate 5 is slidably inserted into the mounting area 105. When the device is engaged with the bulk seed box, the engagement members 10 and support tabs 15 stabilize and align the device in a cantilevered position. The engagement members 10 are horizontally spaced apart at a fixed distance. The size, shape, and spacing of the engagement members 10 are configured to be slidably inserted into the spaced-apart openings 107 and align the device in the proper position. The support tabs 15 engage the floor of the mounting area 105 and vertically stabilize the device in a cantilevered position.

Figure 5:
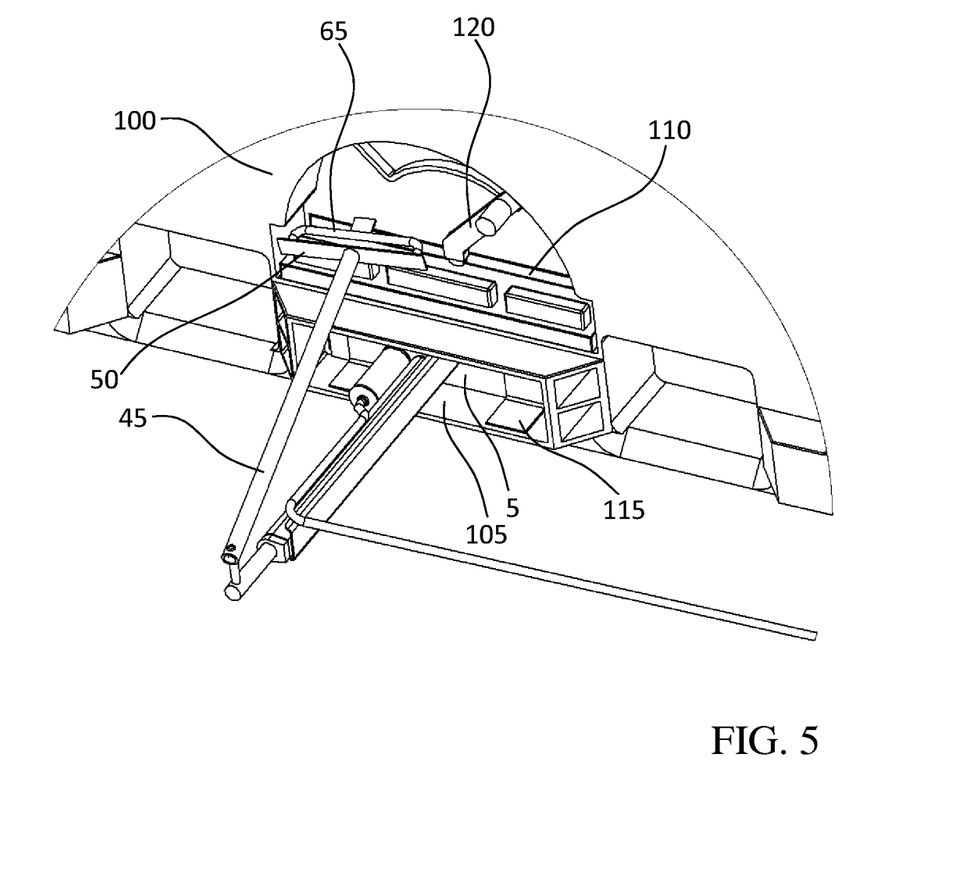
FIG. 5 is a top view of the bulk seed box with the device engaged.

In FIG. 5 there is shown the bulk seed box 100 with the lock handle 120 in the locked position. The lock handle 120 pivots between a locked and unlocked position such that the discharge gate 110 is prevented from opening when the lock handle 120 is in the locked position. When the lock handle 120 is in the unlocked position, the opener arm 45 can be pivotally adjusted so that the latch 65 receives the discharge gate tab 115. The lock handle 120 must be in the unlocked position for the latch 65 to engage the discharge gate tab 115. The device is ready to operate when mounting bracket is fully inserted and the discharge gate tab 115 is received between the latch 65 and the front side 60 of the latch plate 50.

Figure 6:
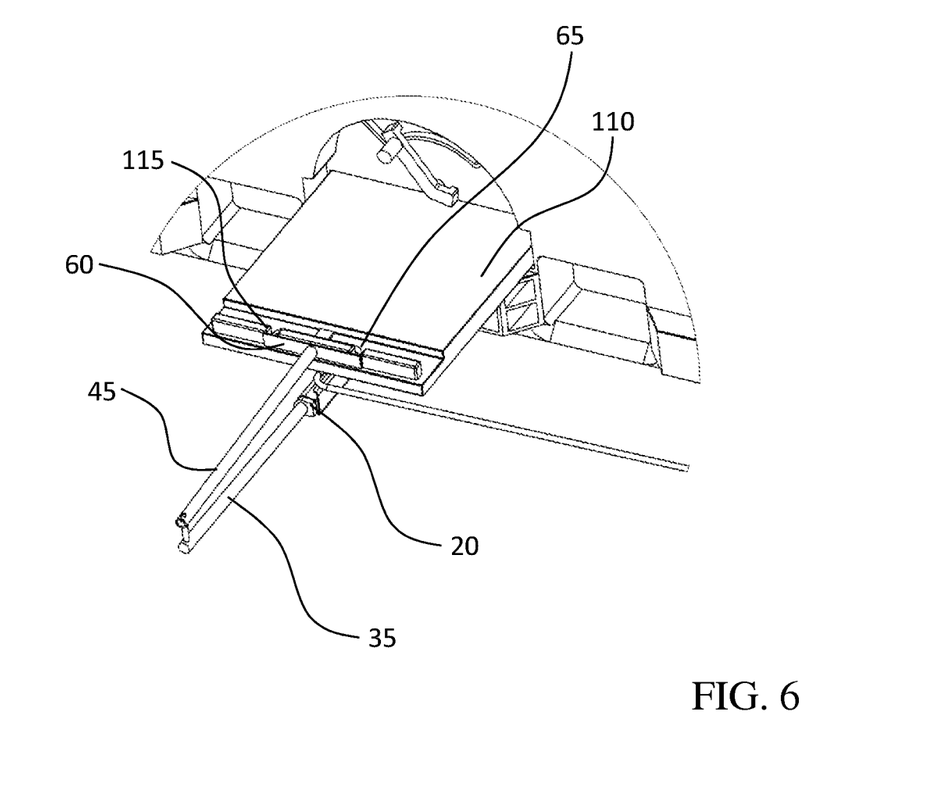
FIG. 6 is a top view of the bulk seed box with the discharge gate opened.

In FIG. 6, there is shown the bulk seed box in the open position. To open the discharge gate 110, the actuator 30 extends the adjustable actuator arm 35. This motion causes the engaged opener arm 45 and latch 65 to pull on the discharge gate tab 115 and slidably open the discharge gate 110. To close the discharge gate 110, the actuator 30 retracts the adjustable actuator arm 35. This motion causes the engaged opener arm 45 and latch plate 60 to push on the discharge gate 110 and slidably close the discharge gate 110.

The pivot connection between the opener arm and the electric actuator allows the device to remain engaged with the bulk seed box, even when the device is retracting and putting pressure to remove the device. When the device encounters resistance during retraction, the vertical movement allowed by the pivot connector allows the mounting plate, engagement members, and support tabs to maintain sufficient friction with the bulk seed box.

Figure 7:
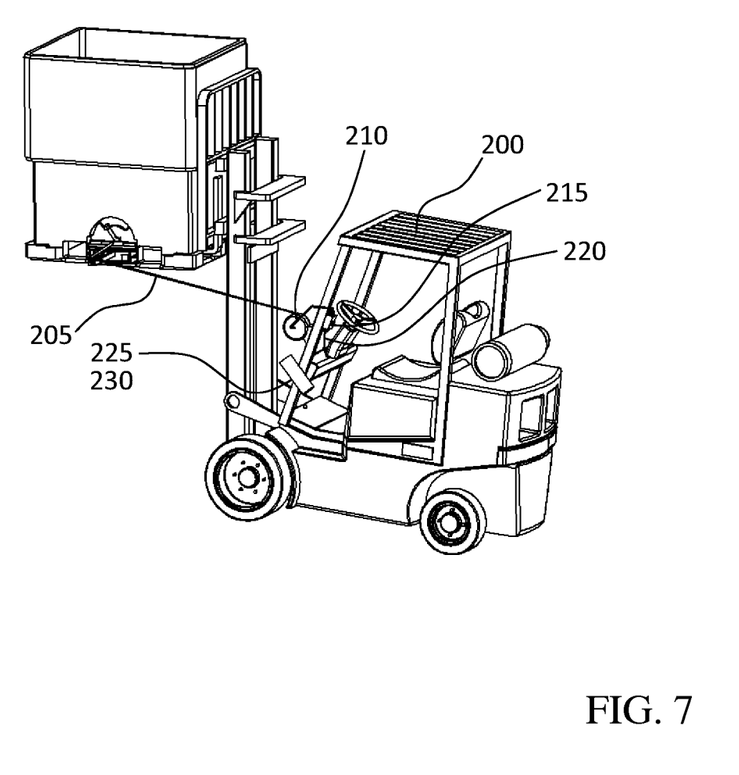
FIG. 7 is a side view of the forklift raised bulk seed box with the device engaged.

In FIG. 7, there is shown the device as operated from the control seat of a forklift 200. The power control cord 205 is operably connected to the actuator 30. The power control cord 205 is disposed about a retractable cord reel 210 that is mounted on the forklift 200. Retractable cord reels are known in the art and allow the user to conveniently engage and disengage the device without tending to the organization of a long power and/or control cables.

The power control cord 205 receives power from an input power source 220. The input power source 220 may be the electrical system of a forklift or an independent battery power source. A remote control switch 215 is mounted to the forklift or tractor. The remote control switch 215 is operably connected to the actuator 30 through the power control cord 205, and controls the extension and retraction of the actuator 30. The forklift or tractor operator can conveniently control the opening and closing of the discharge gate by means of the remote control switch 215 that is accessible from the operator's chair.

There is also shown a nesting tube 225, mounted on the forklift with means such as a bolted bracket. The nesting tube 225 allows for convenient storage when the device is disengaged from a bulk seed box. The nesting tube 225 is a plastic or metal hollow tube that is configured to receive the length portion of the T-shaped device.

It will thus be seen that the present invention provides a remote hand-held device for opening and closing the discharge gate of a bulk seed box. Many modifications and other embodiments of the invention set forth herein will come to mind to one skilled in the art. Therefore, it is to be understood that the invention is not limited to the specific embodiments disclosed and that modifications and other embodiments are intended to be included within the scope of the appended claims. Specific terms are used in a generic and descriptive sense only and not for the purposes of limitation.

What is claimed is:

1. A removable device for opening and closing a discharge gate of a bulk seed box, where the discharge gate is slidably movable between an open and closed position and the discharge gate has one or more tabs, comprising:
    a generally T-shaped frame having a mounting plate and a frame arm, such that the frame arm is disposed perpendicular to the mounting plate;
    an electrically powered actuator disposed thereon such that an adjustable actuator arm extends and retracts perpendicular to said mounting plate;
    an opener arm having a secured end and a free end;
    a pivot connector that pivotally connects said adjustable actuator arm and said secured end of said opener arm;
    a latch plate that disposed on said free end of said opener arm;
    a latch disposed on said latch plate that is capable of receiving the discharge gate tab of a bulk seed box within said latch;
    where said actuator arm extends causing said latch to slidably pull said discharge gate tab such that said discharge gate to slide to an the open position; and
    where said actuator arm retracts causing said latch plate to slidably push said discharge gate such that said discharge gate to slide to a closed position.

2. The device of claim 1, wherein one or more protruding engagement members are disposed on said mounting plate, where said protruding engagement members are spaced apart by a fixed distance and configured to slidably insert into one or more spaced apart openings in the bulk seed box.

3. The device of claim 1, wherein one or more support tabs are disposed on said mounting plate, where said support tabs are configured to engage the floor of the bulk seed box mounting area and vertically stabilize the device.

4. The device of claim 1, wherein said electrically powered actuator is remotely controlled.

5. The device of claim 1, wherein a power control cord for said electrically powered actuator is disposed within a retractable cord reel.

6. The device of claim 1, wherein said latch contains a protruding discharge gate diverter that prohibits said latch from receiving said discharge gate tab when the lock handle is in the locked position.

7. The device of claim 1, wherein said device is operably connected to the electrical system of a forklift.

8. A removable device for opening and closing a discharge gate of a bulk seed box, where the discharge gate is slidably movable between an open and closed position and the discharge gate has one or more tabs, comprising:
    a generally T-shaped frame having a mounting plate and a frame arm, such that the frame arm is disposed perpendicular to the mounting plate;
    one or more protruding engagement members disposed on said mounting plate, where said protruding engagement members are spaced apart by a fixed distance and configured to slidably insert into one or more spaced apart openings in the bulk seed box;
    an electrically powered actuator disposed thereon such that an adjustable actuator arm extends and retracts perpendicular to said mounting plate;
    an opener arm having a secured end and a free end;
    a pivot connector that pivotally connects said adjustable actuator arm and said secured end of said opener arm;
    a latch plate that disposed on said free end of said opener arm;
    a latch disposed on said latch plate that is capable of receiving the discharge gate tab of a bulk seed box within said latch;
    where said actuator arm extends causing said latch to slidably pull said discharge gate tab such that said discharge gate to slide to an the open position; and
    where said actuator arm retracts causing said latch plate to slidably push said discharge gate such that said discharge gate to slide to a closed position.

9. The device of claim 8, wherein one or more support tabs are disposed on said mounting plate, where said support tabs are configured to engage the floor of the bulk seed box mounting area and vertically stabilize the device.

10. The device of claim 8, wherein said electrically powered actuator is remotely controlled.

11. The device of claim 8, wherein a power control cord for said electrically powered actuator is disposed within a retractable cord reel.

12. The device of claim 8, wherein said latch contains a protruding discharge gate diverter that prohibits said latch from receiving said discharge gate tab when the lock handle is in the locked position.

13. The device of claim 8, wherein said device is operably connected to the electrical system of a forklift.

14. A removable device for opening and closing a discharge gate of a bulk seed box, where the discharge gate is slidably movable between an open and closed position and the discharge gate has one or more tabs, comprising:
    a generally T-shaped frame having a mounting plate and a frame arm, such that the frame arm is disposed perpendicular to the mounting plate;
    one or more protruding engagement members disposed on said mounting plate, where said protruding engagement members are spaced apart by a fixed distance and configured to slidably insert into one or more spaced apart openings in the bulk seed box;
    one or more support tabs disposed on said mounting plate, where said support tabs are configured to engage the floor of the bulk seed box mounting area and vertically stabilize the device;
    an electrically powered actuator disposed thereon such that an adjustable actuator arm extends and retracts perpendicular to said mounting plate;
    an opener arm having a secured end and a free end;

a pivot connector that pivotally connects said adjustable actuator arm and said secured end of said opener arm;

a latch plate that disposed on said free end of said opener arm;

a latch disposed on said latch plate that is capable of receiving the discharge gate tab of a bulk seed box within said latch;

where said actuator arm extends causing said latch to slidably pull said discharge gate tab such that said discharge gate to slide to an the open position; and where said actuator arm retracts causing said latch plate to slidably push said discharge gate such that said discharge gate to slide to a closed position.

15. The device of claim 14, wherein said electrically powered actuator is remotely controlled.

16. The device of claim 14, wherein a power control cord for said electrically powered actuator is disposed within a retractable cord reel.

17. The device of claim 14, wherein said latch contains a protruding discharge gate diverter that prohibits said latch from receiving said discharge gate tab when the lock handle is in the locked position.

18. The device of claim 14, wherein said device is operably connected to the electrical system of a forklift.

* * * * *